Oct. 26, 1937.   L. J. SCHLITZER   2,097,045
EYE FOR MANIKINS AND THE LIKE
Filed March 24, 1936
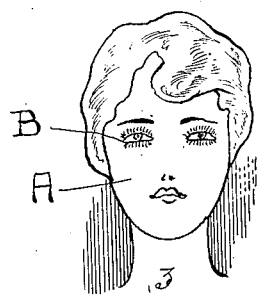
Fig. 1
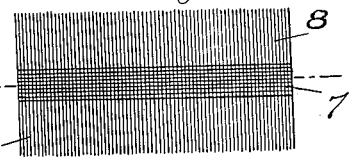
Fig. 10
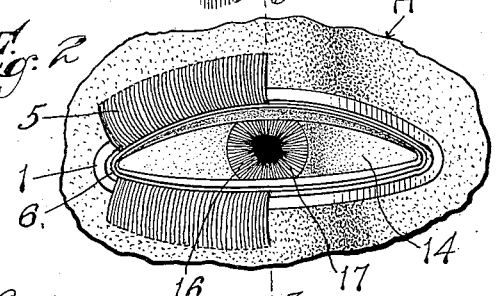
Fig. 2
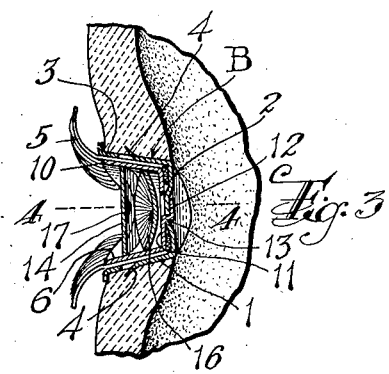
Fig. 3
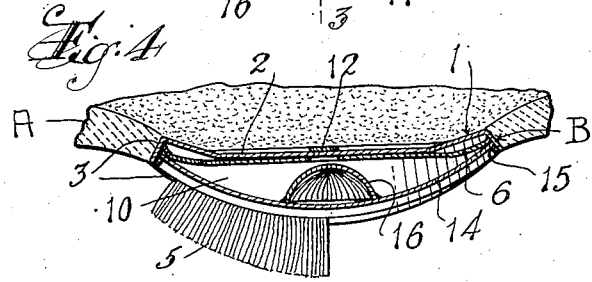
Fig. 4
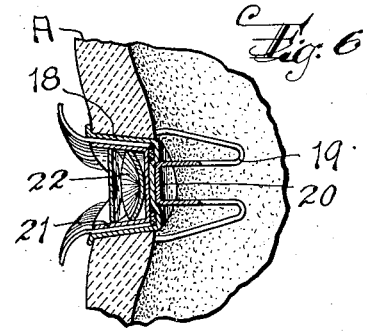
Fig. 6
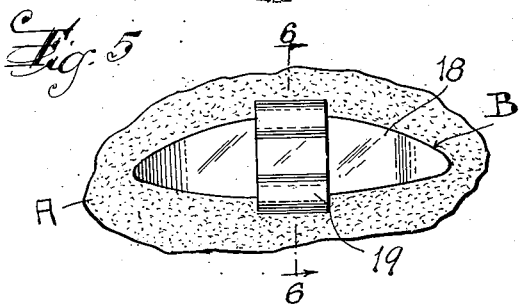
Fig. 5
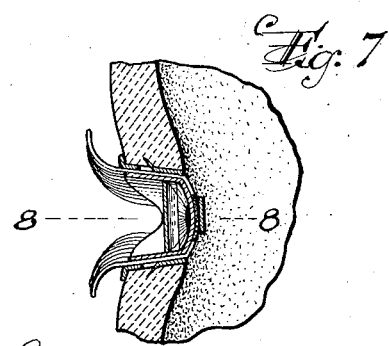
Fig. 7
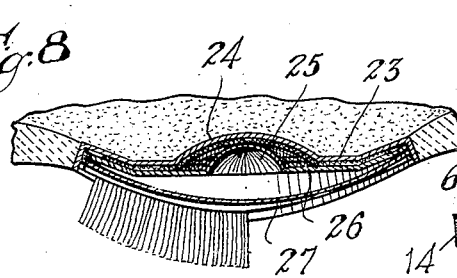
Fig. 8
Fig. 9
INVENTOR
Leo J. Schlitzer
BY Harry B. Rook
ATTORNEY Patented Oct. 26, 1937

2,097,045

UNITED STATES PATENT OFFICE 2,097,045

EYE FOR MANIKINS AND THE LIKE

Leo J. Schlitzer, New York, N. Y., assignor of one-third to Joseph A. Taferner, New York, N. Y., and one-third to Nicholas Popovich, Teaneck, N. J.

Application March 24, 1936, Serial No. 70,578

12 Claims. (Cl. 46—165)

This invention relates in general to artificial eyes for use in manikins, dolls and like artificial figures, one object of the invention being to provide an artificial eye of this character which shall constitute a close and realistic simulation of an anatomical eye, shall be simple and inexpensive in construction and shall be easily and quickly applicable to the head of the manikin, doll or the like.

Another object is to provide such an artificial eye which shall comprise a shell or casing substantially corresponding in shape to the eye opening of a head to contact with and line the walls of said opening, and having novel and improved means for simulating an anatomical eyeball, pupil, iris and lashes.

A further object is to provide in an artificial eye of this character a novel and improved construction and combination of parts for securing eye lashes in position within an eye opening, whereby the lashes can be easily and quickly placed and firmly held in position.

Other objects are to provide a novel and improved combination and arrangement of a cuplike casing to fit in and close an eye opening in a head, a transparent glossy sheet of material to simulate the gloss of an anatomical eye-ball mounted within the casing, said sheet and the bottom wall of the casing being formed to cooperate in simulating an anatomical eye-ball, pupil and iris, the cup-like casing and the transparent sheet being so related as to create a suggestion of depth in the pupil and iris closely approximating the natural appearance of an anatomical eye; to provide novel and improved means for securing a casing within an eye opening, and to obtain other advantages and results as will be brought out by the following description.

Referring to the accompanying drawing in which corresponding and like parts are designated throughout the several views by the same reference character Figure 1 is a front elevation of the head of a manikin or doll having an eye constructed in accordance with my invention.

Figure 2 is an enlarged front elevation of the eye and a portion of the head, with portions of the lashes removed for clearness in illustration.

Figure 3 is a transverse vertical sectional view on the line 3—3 of Figure 2.

Figure 4 is a horizontal sectional view on the line 4—4 of Figure 3.

Figure 5 is a rear elevational view of a modification of the invention.

Figure 6 is a transverse sectional view on the line 6—6 of Figure 5.

Figure 7 is a view similar to Figure 6 showing another form of the invention.

Figure 8 is a horizontal sectional view on the line 8—8 of Figure 7.

Figure 9 is a composite fragmentary perspective view of a portion of the casing and the transparent sheet showing the manner of assembling the parts, and Figure 10 is a plan view of a form of eye lash used in connection with the invention.

Specifically describing the embodiment of the invention illustrated in Figures 1 to 4 inclusive, the reference character A designates the head which has the usual eye opening B in the face portion thereof, said eye opening being preferably tapered from the outer surface toward the inner side of the head. The head is preferably formed of penetrable material, as usual.

The artificial eye is shown as comprising a cuplike element or casing 1 preferably formed of sheet metal and having a bottom wall 2 and flanges 3 which are of approximately the same shape as the walls of the eye opening 2 so that the casing may be inserted into the opening with the flanges contacting with and lining the said walls and the casing closing the eye opening. All portions of the bottom wall 2 of the casing are disposed inwardly of the plane of the edges of the flanges 3. The casing may be secured in the eye opening in any suitable manner, but is shown as having prongs 4 struck up from the flanges 3 to become embedded in the walls of the openings as the casing is inserted thereinto. Preferably the flanges 3 are tapered toward the bottom wall 2 at an angle corresponding to the tapering of the walls of the opening B so as to limit the insertion of the casing into the eye opening.

Eye lashes 5 are disposed along the inner walls of the flanges 3 and are secured in position by a clamping element 6. These lashes may be of woven material having some of the warp or weft threads removed, for example as shown in Figure 10 where the woven material is represented by the reference character 7, and the warp or weft threads have been removed from the other threads 8. If desired, the material may be cut along the line 9 to form two strips of lashes one for the upper portion and the other for the lower portion of the eye opening, or in some cases the strip as shown in Figure 10, may be used without severing as shown in Figures 7 and 8. Preferably the clamping element 6 is also cup-shaped, approximately corresponding to the casing 1 so as to be nested within the casing, and has resilient flanges 10 which frictionally grip the lashes between themselves and the flanges 3 of the casing so as to both hold the clamping element in the casing and the lashes in position. If desired, the clamping element 6 may be positively secured in the casing as shown. For example, the bottom wall 11 of the clamping element may have a lug 12 struck up therefrom and clinched through an opening 13 in the bottom wall of the casing.

The casing contains means for simulating an anatomical eye-ball, pupil and iris. As shown in Figures 2 to 4 inclusive, this means includes a transparent sheet of material 14, such as celluloid, mounted within the flanges 6 of the clamping element in spaced and overlying relation to the bottom thereof. For holding the sheet in position, the clamping element may be formed with slots 15 at its ends at the juncture of the side flanges with the bottom wall, into which slots the ends of the sheet 14 may be inserted (see Figures 4 and 9).

The iris is simulated by a concavo-convex disc 16 which has striations corresponding to the anatomical iris, said disc being arranged between the sheet 14 and the bottom wall of the clamping element 6. If desired, the disc may be secured to the inner side of the sheet 14. The disc may have at its center the representation of a pupil, or the sheet 14 may have the representation of a pupil as indicated at 17 in proper juxta-position to the center of the disc 16. Either the inside surface of the sheet 14 or the bottom wall of the clamping element 6 may be coated with a white substance to simulate an eye-ball, and preferably at least the exposed portions of the flanges 3 and 6 will be colored to simulate eye-lids.

A modification of the invention is shown in Figures 5 and 6 wherein the casing 18 corresponding to the casing 1 is secured in the eye opening by a spring element 19 which is secured to the outside of the bottom wall of the casing in any suitable manner as by spot welding at 20. If desired, the clamping element 21 corresponding to the element 6 may be spot welded to the bottom wall of the casing 18, and similarly the iris disc 22 may be spot welded to the bottom wall of the clamping element 21. With this construction, the spring element 19 may be slipped through the eye opening from the front of the head as the casing 18 is inserted into the eye opening, the spring element then expanding into contact with the inner walls of the head, as clearly shown in Figure 6.

Another modification is shown in Figures 7 and 8 where the casing 23 has a portion 24 of its bottom wall displaced to provide a clearance for a depressed portion 25 on the bottom wall of the clamping element 26. This depressed portion 25 is formed to simulate the iris of the eye, and the transparent sheet 27 corresponding to the sheet 14 is secured in the clamping element 26 in spaced and overlying relation to the bottom wall thereof, as in the other structures hereinbefore described. In this form of the invention, the clamping element 26 may be frictionally secured within the casing 23, or the bottom wall of the clamping element may be spot welded to the bottom wall of the casing.

If desired, the eye lashes may be made of metal mesh or gauze in the form illustrated in Figure 10, and may also be spot welded between the clamping element 26 and the casing 23.

In some cases it may be desirable to use only a single cup-like casing without the clamping element 6, in which case the lashes might be secured between the flanges of the casing and the walls of the eye opening, or secured within the flanges of the casing in any suitable manner.

In all forms of the invention the flanges of the clamping element simulate eyelids and the casing and said flanges hold the upper and lower lashes in outwardly diverging relation to closely simulate anatomical eyelashes.

Other modifications and changes in the details of construction of the eye will occur to those skilled in the art as within the spirit or scope of the invention.

Having thus described my invention, what I claim is:

1. An artificial eye for manikins comprising a cup-like casing of a shape to fit in and close an eye opening of a head with its flanges to contact with and line the walls of said opening, and a spring element secured on the outside of the bottom of said casing to slip through said eye opening from the front of the head and snap over the inner walls of the head to hold said casing in the opening.

2. An artificial eye for manikins comprising a casing to fit in and close an eye opening in a head, and a spring element on said casing to slip through said eye opening from the front of the head and snap over the inner walls of the head to hold said casing in the opening.

3. An artificial eye for manikins comprising a cup-like element to fit in and close an eye opening in a head with its flanges corresponding in shape to said eye opening, a transparent sheet mounted within the flanges of said element, said element having a slot at each end thereof through which the respective end of said sheet is inserted to hold the sheet in said element.

4. An artificial eye for manikins comprising a cup-like casing of a shape to fit in and close an eye opening of a head with its flanges to contact with and line the walls of said opening, said flanges having outwardly projecting prongs to be embedded in the walls of the opening for holding the casing in the opening, and means within said casing to simulate an anatomical eyeball, pupil and iris.

5. An artificial eye for manikins comprising a cup-like casing of a shape to fit in and close an eye opening of a head with its flanges to contact with and line the walls of said opening, said flanges tapering toward the bottom of said casing to limit insertion of the casing into said opening and having outwardly projecting prongs to be embedded in the walls of the opening for holding the casing in the opening, and means within said casing to simulate an anatomical eyeball, pupil and iris.

6. An artificial eye for manikins comprising a casing corresponding in shape to an eye opening in a head and to contact with the walls of said openings, and having outwardly projecting prongs to be embedded in the walls of the opening for holding the casing in the opening, and means within said casing to simulate an anatomical eyeball, pupil and iris.

7. An artificial eye for manikins comprising a cup-like casing of a shape to fit in an eye opening of a head with its flanges to contact with and line the walls of said opening and tapering toward the bottom of the casing, lashes lying along the inner side of said flanges, and a clamping element within said flanges clamping said lashes between itself and said flanges, said clamping element having resilient flanges corresponding in shape to the flanges of said casing to frictionally clamp said element and said lashes within said casing and hold the upper and lower lashes in outwardly diverging relation, and a representation of an eyeball, pupil and iris within said element and including a sheet of transparent material secured within the flanges of the element and extending transversely of the element.

8. An artificial eye for manikins comprising a cup-like casing of a shape to fit in an eye opening of a head with its flanges to contact with and line the walls of said opening, lashes lying along the inner side of said flanges, and a clamping element within said flanges for clamping said lashes between itself and said flanges, said clamping element being cup-like and nested in said casing to clamp said eyelashes between its own flanges and the flanges of said casing, and one of said clamping element and casing having a lug which is clinched through an opening in the bottom wall of the other to secure said clamping element in the casing.

9. A head for manikins having eye openings the walls of which are tapered from the outer surface inwardly of said openings, and an eye member in each opening comprising a casing having walls corresponding in shape to and contacting with said walls of the eye opening, lashes lying along the inner side of said walls of the casing, and a clamping element having flanges which correspond in shape to said walls of the casing, said element being secured in said casing and clamping said lashes between said walls of the casing and said flanges, whereby said flanges simulate eyelids and hold the upper and lower lashes in outwardly diverging relation to closely simulate anatomical eyelashes.

10. A head for manikins having eye openings and an eye member in each opening including a cup-like casing fitted into the eye opening with the flanges of the casing extending outwardly and conforming to the walls of the eye opening, and a representation of an eyeball, pupil and iris within said casing including a sheet of transparent glossy material mounted within and contacting at its edges with said flanges and in spaced and overlying relation to the bottom wall of said casing, and a part representing an iris disposed between said sheet and said bottom wall.

11. A head for manikins having eye openings and an eye member in each opening including a hollow sheet metal casing having walls conforming to and in contact with the walls of said opening, means securing the casing in the eye opening, and a representation of an eyeball, pupil and iris within said casing including a sheet of transparent material secured within and extending transversely of the casing with the edges of the sheet conforming to said walls of the casing, and a part representing an iris within the casing and behind said sheet having a concave portion facing the sheet.

12. A head for manikins having eye openings, an eye member in each opening comprising a casing having outwardly inclined walls corresponding in shape to the eye opening in a head and in contact with the walls of said opening, eyelashes lying along the inner walls of said casing, and a cup-like element having a bottom wall and flanges outwardly inclined from said bottom wall corresponding in shape to said walls of said casing and fitted therein with said lashes clamped between said walls of the casing and the flanges of said element, and a representation of a pupil and iris in said element including a transparent sheet mounted within said casing and said element inwardly of the edges of said casing and in spaced overlying relation to the bottom wall of the element.

LEO J. SCHLITZER.